July 25, 1950                P. A. NOXON ET AL                2,516,796
                               AUTOMATIC PILOT
Original Filed Dec. 31, 1943                        5 Sheets-Sheet 3
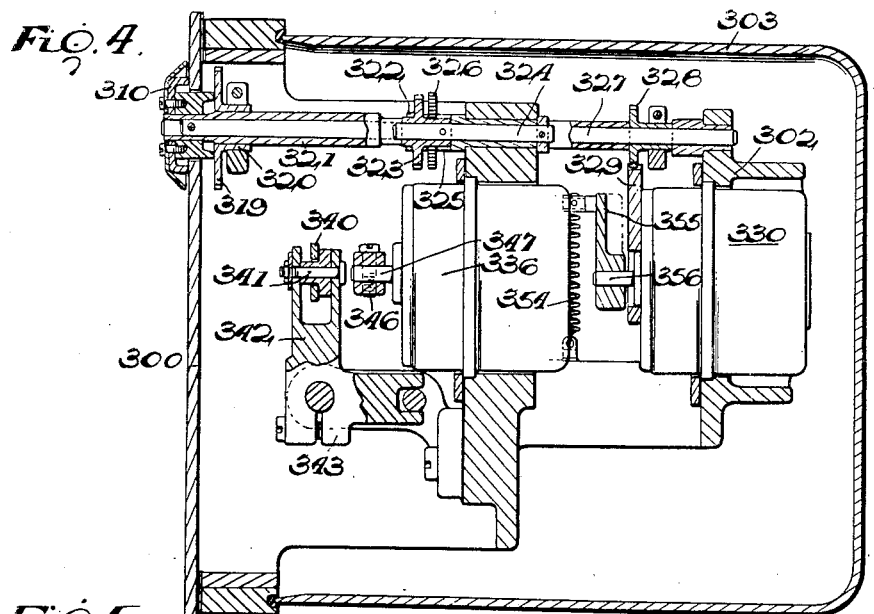
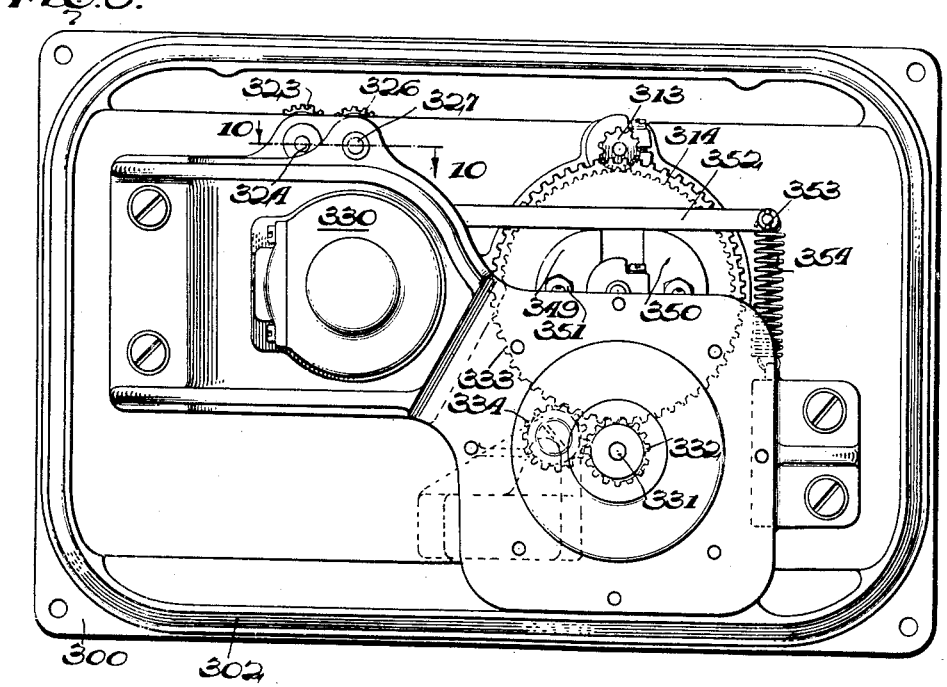
INVENTORS
*Paul A. Noxon*
BY *N. B. Murphy.*
ATTORNEY.

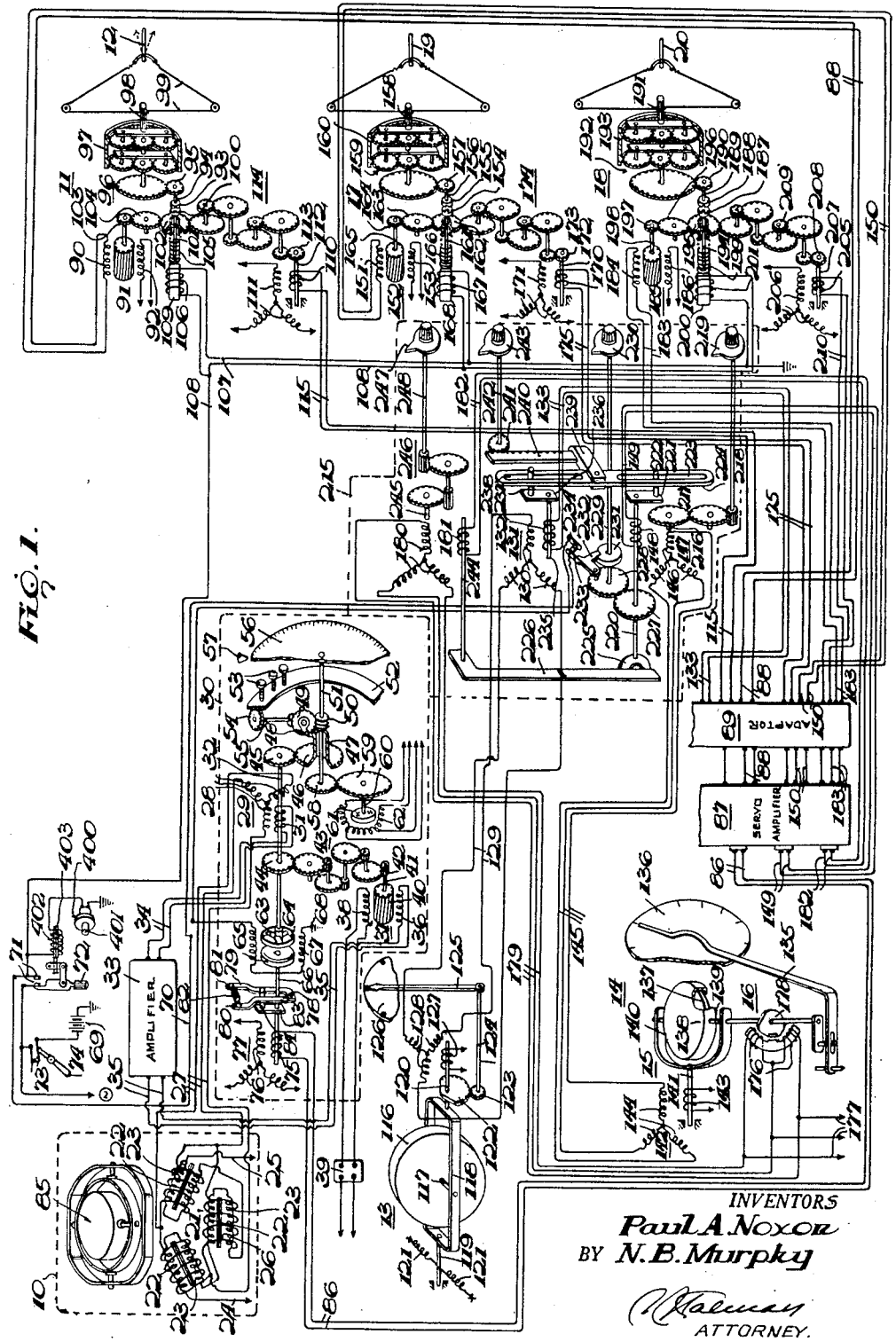

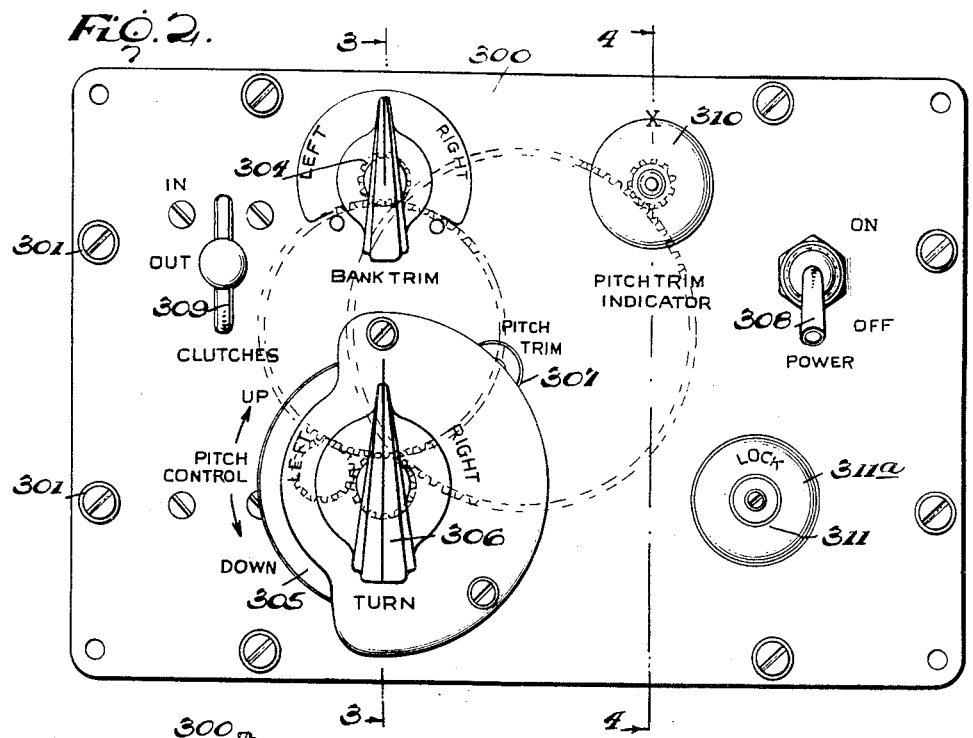
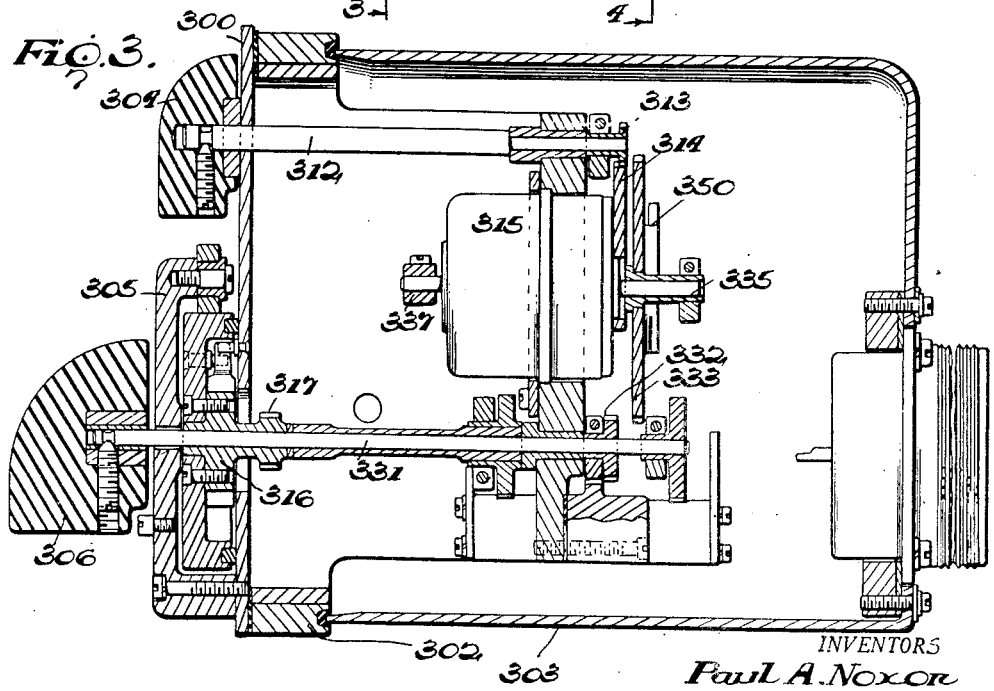

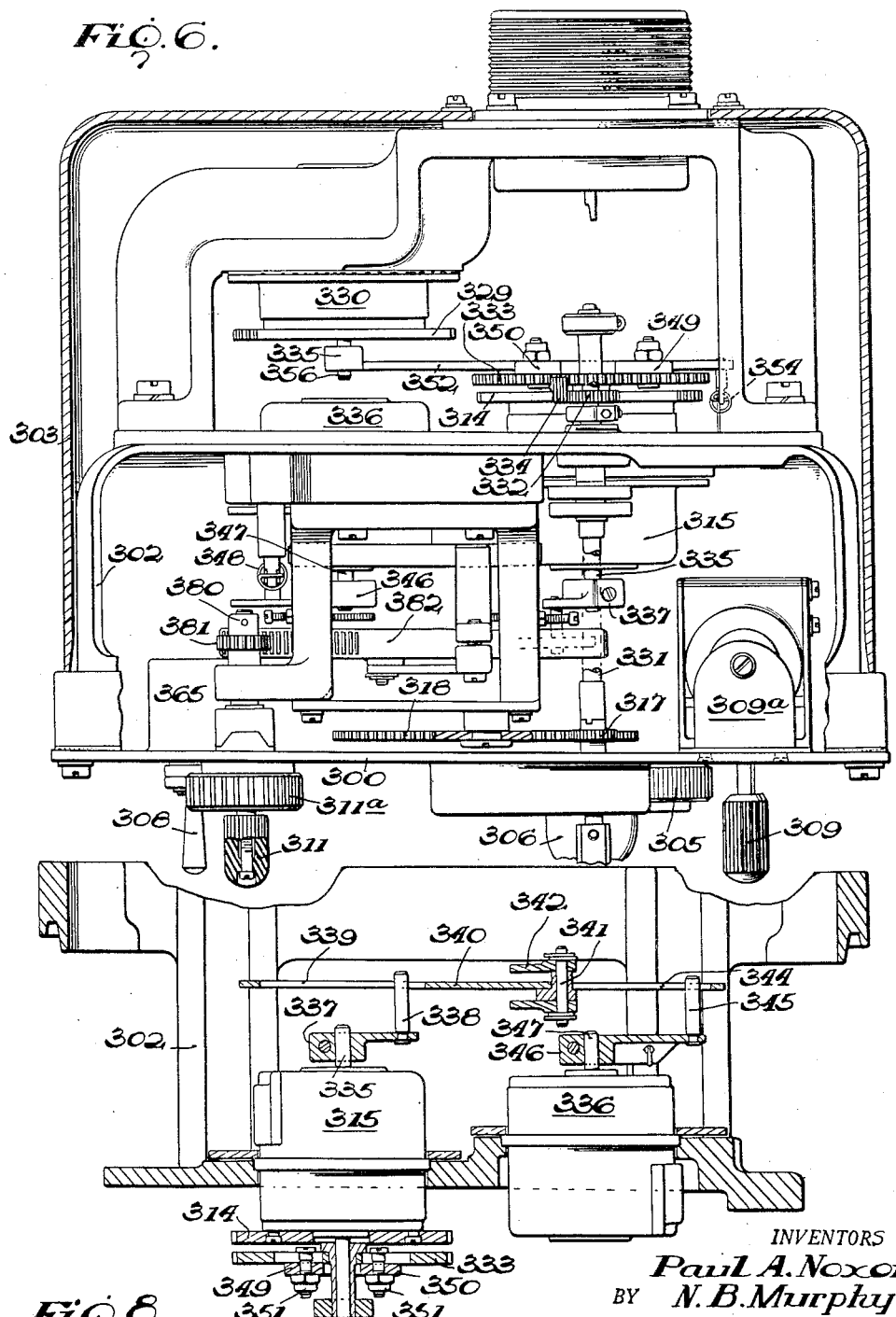

July 25, 1950 P. A. NOXON ET AL 2,516,796
AUTOMATIC PILOT
Original Filed Dec. 31, 1943 5 Sheets-Sheet 5
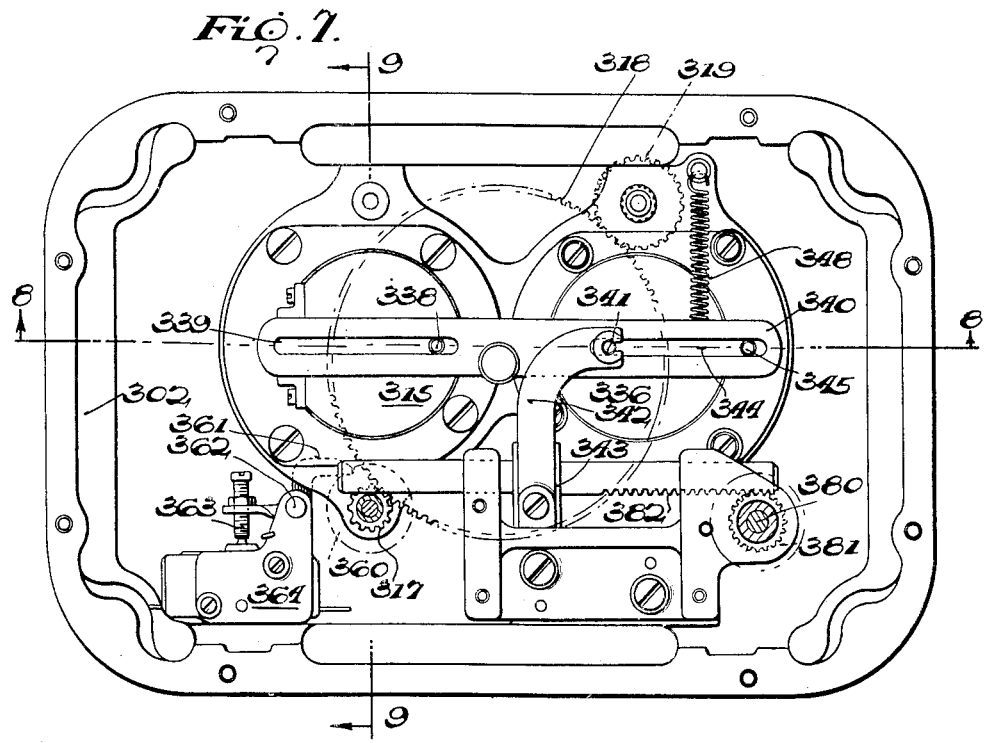
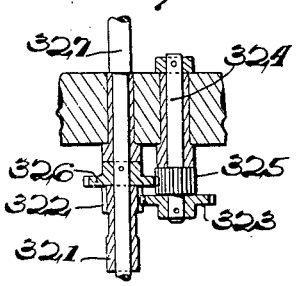
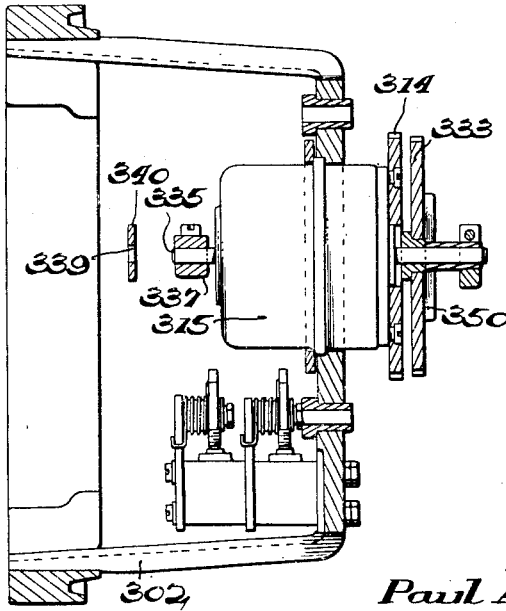
INVENTORS
Paul A. Noxon
BY N. B. Murphy
ATTORNEY Patented July 25, 1950

2,516,796

UNITED STATES PATENT OFFICE 2,516,796

AUTOMATIC PILOT

Paul A. Noxon, Tenafly, and Norman B. Murphy, West Englewood, N. J., assignors to Bendix Aviation Corporation, Teterboro, N. J., a corporation of Delaware Original application December 31, 1943, Serial No. 516,489. Divided and this application May 22, 1945, Serial No. 595,236

21 Claims. (Cl. 244—77)

1

This invention relates generally to automatic pilot or control systems for dirigible craft or the like having novel provision therefor for imparting an automatic turn to the craft in the manner more fully described and claimed in copending application Serial No. 516,489, filed December 31, 1943, and more particularly to a novel panel arrangement for initiating and controlling such turn, the present application constituting a division of the aforementioned copending application.

Where parent application Serial No. 516,489 deals with the system as a whole for maneuvering a dirigible craft into an automatic turn without calling upon the master instruments to initiate the turn thus leaving the latter free to respond to only those functions of normal course change, rate of course change and attitude change for which they were designed, the present application deals with the novel control panel for the system and the arrangement of instruments thereat for initiating and controlling a desired turn independently of the master instruments.

An object of the present invention, therefore, is to provide an automatic pilot system for dirigible craft with a novel automatic turn mechanism.

Another object of the invention is to provide a novel automatic turn provision for an automatic pilot or steering system whereby correctly banked turns at any desired rate may be automatically obtained.

A further object is to provide a novel control panel for an aircraft automatic pilot which upon manual manipulation will maneuver the craft into an automatic turn at the correct banking angle for a desired turn, an airspeed adjustment being provided on the panel to assure correct angles of bank for widely differing airspeeds.

Another object of the invention is to provide a compact and novel control panel for an automatic pilot embodying a novel automatic turn mechanism therein of the character described for controlling the direction and attitude of a craft, the panel being provided with pitch and bank trim knobs for readily trimming elevator and aileron surfaces as required during linear flight. By manipulation of the pitch trim knob, for example, the craft may be made to climb or dive and and will continue to climb or dive at an angle corresponding to the setting of the pitch trim knob until the latter is returned to a central position. Moreover, a single turn control knob is provided on the panel whereby the craft may be made to turn at any desired rate, the correct angle of bank for that turn as well as the necessary amount of elevator trim for that turn being

2 simultaneously introduced upon operation of the turn control knob.

The above and other objects and advantages of the present invention will appear more fully hereinafter from a consideration of the detailed description which follows, taken together with the accompanying drawing wherein one embodiment of the invention is illustrated. It is to be expressly understood, however, that the drawings are for the purpose of illustration and description only, and are not designed as a definition of the limits of the invention.

In the drawings, wherein like reference characters refer to like parts throughout the several views:

Figure 1 is a diagrammatic illustration of an automatic control system for dirigible craft embodying the novel automatic turn control panel of the present invention;

Figure 2 is a front elevation view of the novel control panel of the present invention;

Figure 3 is a section view taken substantially along line 3—3 of Figure 2;

Figure 4 is a section view taken substantially along line 4—4 of Figure 2;

Figure 5 is a rear view with the cover removed of the control panel of Figure 2;

Figure 6 is a bottom view of the structure of Figure 5;

Figure 7 is a front elevation view of the structure of Figure 2 with the front panel removed;

Figure 8 is a section view taken substantially along line 8—8 of Figure 7;

Figure 9 is a section view taken substantially along line 9—9 of Figure 7; and

Figure 10 is a detail view of a portion of the structure of Figure 4.

Inasmuch as the novel control panel of the present invention constitutes an integral part of the automatic pilot system of copending application Serial No. 516,489, a general description of the latter system will be given as an aid to a better understanding of the various components of the novel control panel hereof and their individual and combined functions.

As diagrammatically shown in Figure 1 of the drawings the automatic pilot comprises a magnetic field pick-up device, generally designated with the reference character 10, in the form of a gyro-stabilized earth inductor compass, for generating an electrical signal during craft deviation from a prescribed course, proportional to the amount of deviation, for energizing a rudder system 11 to actuate a rudder 12; a rate of turn responsive gyro 13 adapted for generating an electrical signal proportional to the rate of turn which is superimposed upon the directional signal to modify the energization of the rudder servo system 11; and an artificial horizon gyro 14 having bank and pitch take-offs 15 and 16 for generating signals in proportion to the bank and pitch of the craft for energizing aileron and elevator servomotor systems 17 and 18 to actuate ailerons and elevators 19 and 20.

Magnetic field pick-up device 10 for generating an electrical signal proportional to the amount of craft deviation from a prescribed course comprises a triangular element 21 having three laminated legs, each of which is provided with a pair of exciting windings 22, 23 connected in series opposed relation with each other and with a suitable source of alternating current (not shown) by way of leads 24 and 25. Wound in inductive relation to the first coils, which may be considered as the primary windings of the device, is a delta connected coil 26, which may be termed as the secondary winding of the device. Coil 26 is provided with three taps for connecting it by way of leads 27 with a three-phase wound stator 28 of an inductive coupling device 29 suitably mounted within a master indicator 30.

Coupling device 29 is provided with an angularly movable rotor winding 31 inductively associated with the stator windings 28 and carried by a shaft 32 for angular motion relative thereto. Winding 31 is connected to the input of a suitable vacuum tube amplifier 33 by way of leads 34, the output of the amplifier feeding by way of leads 35 to one phase winding 36 of a two phase induction motor 37, the second phase winding 38 of which connects with the source of A. C. current through a suitable frequency doubler 39, the latter also being provided with a conventional phase shifting network to maintain the voltages within the two phase windings substantially 90° apart for proper operation.

Motor 37 has a rotor 40 carried by a shaft 41 provided at its outer end with a pinion 42 adapted for driving through a speed reduction gear system 43, a gear 44 fastened to rotor shaft 32. A gear 45, supported by the free end of shaft 32, meshes with a gear 46 having connected thereto a hollow shaft 47 supporting by way of an arm 48 the shaft of a worm gear 49 which meshes with a worm 50 formed on or carried by a spindle shaft 51 which is received within hollow shaft 47. An annular compensator 52 having a series of adjusting screws 53 in engagement therewith is contacted by a follower 54 supported by an arm 55 fastened to the shaft of worm 49. In addition to any motion imparted by rotor shaft 32 to spindle shaft 51, the latter is thereby also moved a small angular amount in one direction or another depending upon the contour of element 52 engaged by follower 54.

An indicating dial 56 is mounted on one end of spindle shaft 51 for cooperation with a fixed index 57 while the opposite end of the spindle is provided with a gear 58 for meshing with a gear 59 carried by a shaft 60 supporting a magnetic rotor 61 thereon which is magnetically coupled with a stator winding 62 of an electromagnetic transmitter, the latter being adapted for connection to a similar device acting as a receiver located at a remote station to reproduce the indication of heading.

The free end of rotor shaft 32 carries through a resilient supporting member 63 one face 64 of a magnetic clutch. A cooperating clutch face 65 is supported by a suitably journalled shaft 66, both clutch faces 64, 65 being formed of magnetic material. A coil 67 surrounds the clutch faces and has one end thereof grounded as at 68 and the other end thereof connected with a battery 69 by way of a normally closed control switch at the novel control panel to be presently described, a lead 70, contacts 71 of a servo clutch switch 72 and contacts 73 of a power switch 74.

With the closing of switches 74 and 72, and the control switch at the panel, coil 67 is energized and clutch faces 64, 65 are brought into driving engagement whereby any motion of shaft 32 is transmitted to shaft 66 which also supports thereon a rotor winding 75 inductively associated with a three phase wound stator 76 of an inductive transmitting device 77.

Two lever arms 78 and 79 are provided within the master indicator which are pivoted on fixed pins 80 and 81 and interconnected through a resilient member 82 anchored to both arms slightly below pivot pins 80 and 81. A bracket 83 is fastened to shaft 66 and is provided with a pin 84 positioned in between arms 78 and 79 so that upon clockwise rotation of shaft 66, for example, pin 84 will move arm 79 outwardly when a turning torque is exerted on shaft 66, spring 82 returning the arm and pin as well as shaft 66 to neutral when the torque is no longer applied, that is, when the clutch is disengaged, while upon a counterclockwise rotation of shaft 66, pin 84 urges arm 78 outwardly, the arm returning pin 84 and shaft 66 to neutral under the action of spring 82 when the turning torque is released. As a result of the foregoing provision the rotor winding 75 of transmitter 77 will always be urged to and maintained at an electrical zero prior to the engagement of the automatic steering system. This means that no matter how much the craft course has been changed, once it is placed on a desired course and the automatic pilot is engaged, rotor winding 75 will only have a signal generated therein of an amount proportional to the angle of deviation by the craft from the desired course.

Element 21 of the magnetic field pick-up device together with its primary and secondary windings is stabilized and maintained in a horizontal plane by means of a stabilizing gyroscope generally designated with the reference character 85, so that a compass is provided in which, for all practical purposes, turning and acceleration errors are eliminated.

Upon a craft departure from a prescribed course, the voltages induced within coil 26 of the pick-up device are varied to vary the voltages at coupling stator 28 whereby a signal is induced within rotor winding 31 proportional to the amount of craft departure from its course, which is amplified within amplifier 33 to energize phase winding 36 of motor 37, the second phase being continuously energized from the source of alternating current. Rotor 40 of motor 37 drives shaft 32 and rotor winding 31 to a null position. At the same time, assuming clutch faces 64, 65 to be in driving engagement, rotor winding 75 of transmitter 77 is moved angularly relative to stator winding 76 and a signal is induced therein proportional to the amount of craft departure from its prescribed course. This signal is fed by suitable leads 86 to the input of a servo vacuum tube amplifier 87 and out therefrom by way of outlet leads 88 through a servo adapter 89 to energize one phase winding 90 of an induction motor 91, the second phase winding 92 of which is continuously energized from the craft's source of A. C. current.

A driving connection between motor 91 and rudder 12 is established by way of a servo clutch comprising a clutch face 93 mounted upon a shaft 94 carrying a pinion 95 thereon for engagement with a speed reduction gear system 96 supported within a relatively stationary servo casing 97 for driving a rudder shaft 98 connected by means of cables 99 with rudder 12, and a second clutch face 100 fastened to a shaft 101 keyed to a gear 102 but adapted for longitudinal motion relative thereto, gear 102 connecting with a pinion 103 of motor 91 through an idler gear 104. The free end of shaft 101 has an enlarged portion defining an abutment for one end of a spring member 105, the other end of which rests against gear 102.

The actuating means for axially moving shaft 101 to the right to force clutch face 100 to drivably engage clutch face 93 comprises a solenoid coil 106 grounded at one end by way of a lead 107 and connected to one of contacts 71 of servo clutch switch 72 by way of a lead 108. With switch 72 closed, a core 109 of the solenoid is urged to the right against the action of a spring 105 to axially move shaft 101 therewith to provide engagement of the clutch faces so that motor 91 drives rudder 12.

In driving gear 102, motor 91 also angularly displaces a rotor winding 110 of an inductive follow-back device having a three-phase wound stator 111, the rotor being supported by a shaft 112 having a pinion 113 which is drivably connected to gear 102 through a suitable speed reduction gear train 114. Displacement of rotor winding 110 relative to stator windings 111 generates an electrical follow-back signal which is fed by means of leads 115 to amplifier 87 through servo adapter 89 to be impressed upon the direction signal within the amplifier to thereby modify the operation of the motor. The follow-back signal opposes the direction signal and at such time that the follow-back signal is equal and opposite to the direction signal motor 91 becomes de-energized.

When the craft departs from its prescribed course it develops a certain amount of angular velocity which is taken into account in the control of rudder 12 by the provision of the rate gyro 13 which comprises a rotor 116 having normally horizontal spin axis supported by way of inner trunnions 117 within a gimbal ring 118, the latter being mounted upon a rigid support by way of trunnions 119 and 120 for oscillation about a second horizontal axis perpendicular to the spin axis. Resilient members 121 secured to trunnion 119 yieldably restrain gyro precession during turn to a rate of turn function. Trunnion 120 of gyro 13 carries a gear sector 122 for meshing with a pinion 123 mounted on a spindle shaft 124 carrying an indicator 125 for cooperation with a suitable scale 126, as well as a rotor winding 127 inductively associated with a three-phase wound stator 128 of an inductive device, the rotor being connected for energization by the craft's source of A. C. current.

The windings of stator 128 connect by way of leads 129 with a three-phase wound stator 130 of an inductive repeater or receiver device 131 likewise provided with a rotor winding 132 which is connected to adapter 89 by way of leads 133 to be superimposed upon the follow-back signal to further modify the operation of motor 91 when the craft departs from a predetermined course. Due to such departure, the induced voltages within stator 128 vary causing a corresponding change in the voltages of stator windings 130 whereupon a signal proportional to the rate of turn is generated within rotor winding 132 to be algebraically added to the direction and follow-back signals energizing phase winding 90 of motor 91.

For aileron and elevator control horizon gyroscope 14, which may be an artificial horizon, has a horizon bar 135 mounted for up and down movement relative to a mask 136 for designating craft pitch, the mask, in turn, being adapted for angular movement relative to the bar for designating craft bank. The gyro per se may comprise an electrically driven rotor 137 having normally vertical spin axis mounted within a rotor bearing frame 138 provided with inner trunnions 139 mounting the rotor and frame within a gimbal ring 140 for oscillation about a first horizontal axis, the gimbal having an outer trunnion 141 mounting it for oscillation about a second horizontal axis perpendicular to the first.

Bank take-off 15 comprises an inductive transmitter device 142 having a rotor winding 143 carried by outer trunnion 141 and energized by the craft's source of alternating current, rotor 143 being inductively associated with a three-phase wound stator 144 which connects by way of leads 145 with a three-phase wound stator 146 of an inductive repeater or receiver device 147 having a rotor winding 148 inductively coupled therewith so that any change of voltages caused within stator 144 due to angular movement of rotor winding 143 creates a like change in the voltages of stator 146 whereby a signal is induced within rotor winding 148 proportional to the amount of craft bank.

The signal induced within rotor winding 148 is fed into amplifier 87 by way of leads 149 and fed out therefrom through servo adapter 89 by way of outlet leads 150 to one phase winding 151 of a two phase induction motor 152, the second phase winding 153 of which is continuously energized from the craft's source of A. C. current. Motor 152 constitutes a part of the aileron servo system 17 and a driving connection is established between it and ailerons 19 through a solenoid operated clutch which comprises two clutch faces 154 and 155, the latter being carried by a shaft 156 provided with a pinion 157 for driving aileron driving shaft 158 through a speed reduction gear system 159 supported within a relatively stationary casing 160, and clutch face 154 being carried by a shaft 161 which has a gear 162 keyed thereto but is adapted for axial movement relative thereto. Gear 162 is driven by motor 152 through an idler 163 which meshes with a pinion 164 carried by a motor shaft 165.

Clutch faces 154 and 155 are normally held disengaged by virtue of a resilient spring 166 which abuts gear 162 at one of its ends and an enlarged portion of shaft 161 at its other end to urge the latter shaft to the left. The actuating means for axially moving shaft 161 to the right to force clutch face 154 to drivably engage clutch face 155 comprises a solenoid coil 167 which is connected to conductor 107 at one end to ground and at its other end to contact 71 of switch 72, by way of a lead 108. With switch 72 in its "on" position, i. e., with contacts 71 engaged, coil 167 is energized to urge a core 168 to the right against the action of spring 166 whereupon shaft 161 is moved to the right to bring clutch faces 154 and 155 into engagement whereby a driving connection is established between motor 152 and ailerons 19.

In driving gear 162, motor 152 also angularly displaces a rotor winding 170 of an inductive follow-back device having a three-phase wound stator 171, the rotor winding being inductively coupled with the stator and being carried by a shaft 172 having a pinion 173 thereon which drivably connects with gear 162 through a suitable speed reduction gear train 174. Displacement of the rotor winding relative to stator 171 during operation of motor 152 generates an electrical follow-back signal which is fed by way of leads 175 to amplifier 87 through servo adapter 89 to be impressed upon bank signal within the amplifier to modify operation of motor 152. The follow-back signal opposes the bank signal and at such time as the follow-back signal becomes equal and opposite to the bank signal motor 152 becomes de-energized.

Pitch take-off 16 comprises an inductive transmitter device having stator windings 176 provided with three taps, the windings being energized from the craft's source of A. C. current by virtue of leads 177. A rotor 178 in the form of a magnetic vane is inductively associated with the stator and is secured to inner trunnion 139 for angular movement relative to the stator windings. The stator windings 176 connect by way of leads 179 with a three-phase wound stator 180 of an inductive repeater or receiver device having a rotor winding 181 inductively associated therewith so that any change in voltages caused within stator windings 176 due to angular movement of rotor 178 creates a like change in the voltages of stator 180 whereby a signal is induced within rotor 181 proportional to the amount of craft pitch.

The signal induced within rotor winding 181 is fed by conductors 182 to amplifier 187 and out therefrom through servo adapter 189 by way of outlet leads 183 to one phase winding 184 of a two phase induction motor 185, the second phase winding 186 of which is continuously energized from the craft's source of A. C. current.

Motor 185 constitutes a part of the elevator servo system 18 and a driving connection is established between it and elevator surfaces 20 through a solenoid operated clutch which comprises two clutch faces 187 and 188, the latter being carried by a shaft 189 provided with a pinion 190 for operating elevator driving shaft 191 through a speed reduction gear system 192 supported within a relatively stationary casing 193, and a clutch face 187 being carried by a shaft 194 which has a gear 195 keyed thereto but is adapted for axial movement relative thereto. Gear 195 is driven by motor 185 through an idler 196 which meshes with a pinion 197 carried by a motor shaft 198.

Clutch faces 187 and 188 are normally disengaged by virtue of a resilient spring 199 which abuts gear 195 at one of its ends and an enlarged portion of shaft 194 at its other end to urge the latter shaft to the left. The enlarged end of shaft 194 is engaged by a core 200 of a solenoid whose coil 201 is grounded at one end by being tapped to lead 107 and at its other end is connected by way of lead 108 to one of contacts 71 of switch 72. With the switch in its "on" position, i. e., with contacts 71 engaged, coil 201 is energized to urge core 200 to the right whereupon shaft 194 is moved to the right to bring clutch face 187 into engagement with clutch face 188 whereby a driving connection is established between motor 185 and elevators 20.

In driving gear 195, motor 185 also angularly displaces a rotor winding 205 of an inductive follow-back device having a three phase wound stator 206, the rotor being inductively coupled with the stator and supported by a shaft 207 having a pinion 208 which is drivably connected to gear 195 through a suitable speed reduction gear train 209. Displacement of rotor winding 205 during operation of motor 185 generates an electrical follow-back signal which is fed by way of leads 210 to amplifier 87 through servo adapter 89 to be impressed upon the pitch signal within the amplifier to thereby modify operation of motor 185. The follow-back signal opposes the pitch signal and at such time that the follow-back signal is equal and opposite to the pitch signal motor 185 becomes de-energized.

With servo clutch switch 72 in an open or "off" position, even though power switch 74 is closed, coil 67 of the magnetic clutch within master indicator 30 is de-energized so that clutch face 64 is disengaged from clutch face 65 and simultaneously solenoid coils 106, 167 and 201 of the rudder, aileron and elevator servo systems are de-energized whereby motors 91, 152 and 185 are disconnected from their respective control surfaces so that subsequent control of the rudder, aileron and elevator surfaces may be performed manually in the conventional manner.

Coming now to the novel control panel of the present invention and the arrangement thereat of the various components comprising the automatic turn control mechanism of the parent application hereinabove referred to, the former is shown diagrammatically in Figure 1 as encased within a casing 215 which includes principally the inductive rate, bank and pitch repeater or receiver devices. As shown in this figure, stator 146 of the inductive bank receiver device is mounted for angular motion relative to its rotor 148 by means of a shaft 216 which connects through a suitable gear train 217 with a shaft 218 carrying a bank trim knob 219 thereon. Rotor winding 148 of this device is supported for angular motion relative to stator 146 by a shaft 220 which, at one of its ends, has secured thereto a bracket 221 provided with a pin 222 engaging a slot 223 of a lever 224 and at its other end carries a cam member 225 cooperating with a lever 226 together with a gear 227 which meshes with another gear 228 fastened to a shaft 229 carrying a turn knob 230 at the free end thereof. Also carried by shaft 229 adjacent gear 228 is a wheel 231 provided with a notch in which normally rests an arm 232 carrying a contact 233 normally engaging a second contact 234, one of which is connected to coil 67 of the magnetic clutch of the master indicator and the other of which is connected to lead 70 whereby coil 67 is in closed circuit with battery 69.

Stator 130 of the inductive rate receiver device, on the other hand, is stationary but its rotor 132 is mounted for angular movement relative to the stator by means of a shaft 235 which carries a bracket 236 supporting a pin 237 thereon which engages with a second slot 238 of lever 224. The lever itself is supported by a bracket 239 which is fastened to a toothed rack 240 meshing with a pinion 241 carried by a shaft 242 having an airspeed adjustment knob 243 at its free end.

The inductive pitch receiver device has its rotor 181 mounted for angular motion relative to stator 180 by means of a shaft 244 which is fastened to lever 226 whereby upon movement of cam 225 lever 226 is swung in a clockwise direction to move shaft 244 and rotor 181. Stator 180 on the other hand is mounted for angular motion relative to rotor 181 by means of a shaft 245 which connects through a speed reduction gearing 246 with a pitch trim knob 247 carried by a shaft 248.

For unequal loading conditions or for a condition wherein for some reason or another the condition of equilibrium between the inductive transmitting device 142 of the bank take-off and the inductive receiver device 147 has been destroyed, the bank trim knob 219 may be operated to angularly displace stator 146 in one direction or another relative to rotor 148 until the condition of balance has been re-established.

With the automatic pilot engaged, the craft may be forced into a climb by operating pitch trim knob 247 whereby stator 180 is displaced relative to its rotor 181 and it will be maintained in such climb until knob 247 is returned to neutral. To bring the craft into a dive, knob 247 is operated in a reverse direction to reverse movement of stator 180 whereby the signal induced in rotor 181 is reversed to thereby reverse operation of the elevator servo system 18.

If, during the course of linear flight with the automatic pilot engaged, it is desired to change course, the human pilot need merely displace knob 230 an angular amount proportional to the rate of turn desired. Operation of knob 230 turns wheel 231 so that arm 232 is forced outwardly from the notch of the wheel and contacts 233 and 234 become disengaged whereby the circuit to coil 67 of the magnetic clutch of the master indicator is open to de-energize coil 67 and inductive transmitting device 77 is disconnected from the inductive coupling device 29 so that the direction signal no longer acts to energize motor 91 of the rudder servo system. At the same time, gear 228 is turned with knob 230 and it, by virtue of being in mesh with gear 227, displaces rotor 148 relative to stator 146 thereby creating a condition of electrical unbalance between the stator and the rotor so that a bank signal is generated within rotor 148 even though at that moment the artificial horizon shows no bank and bank take-off 15 is in a neutral position.

Motion of rotor 148 simultaneously causes angular movement of bracket 221 and pin 222, the latter by virtue of its engagement with slot 223, pivots lever 224 about a pin carried by supporting bracket 239. Movement of lever 224 also displaces pin 237 which results in angular motion on the part of rotor 132 relative to its stator 130, such motion creating an electrical unbalance resulting in a rate signal being generated in rotor 132 notwithstanding the fact that at that moment the craft is in linear flight and rate gyro 13 as well as the rate take-off are in a neutral position.

As turn knob 230 displaces rotor 148 it also angularly displaces cam 225 which pivots lever 226 to angularly displace rotor 181 relative to its stator 180. Thus, an electrical unbalance is created between the two resulting in the generation of a pitch signal within rotor 181 even though the craft at that moment is in a level attitude so that pitch take-off 16 is in a neutral position. Whether the desired turn be to the right or to the left of a given course, rotor 181 will be displaced in one direction to provide a signal calling for up-elevator in either case to overcome the tendency of the craft to dive when the turn is initiated.

By operation of knob 230 the conditions for a desired turn are automatically established without loading or calling upon the rate gyro or the artificial horizon to control the turn. The signals set in by the turn knob are fed into their respective networks to control related surfaces to swing the craft into a desired turn at the correct angle of bank for that turn together with the necessary up-elevator.

The automatic turn is accomplished and maintained as long as desired by reason of the fact that the rate signal generated within rotor 132 is fed by leads 133 and adapter 89 to the rudder servo network of amplifier 87 and out therefrom by way of leads 88 to energize phase winding 90 of motor 91. Rudder 12 is actuated by motor 91 and, at the same time, rotor 110 of inductive rudder follow-back device is displaced angularly relative to stator 111 whereby a follow-back signal is generated and fed by leads 115 to the rudder network of the amplifier. The rudder is deflected until the follow-back signal is equal and opposite to the rate signal at which time motor 91 becomes deenergized.

At the same time, the bank signal generated within rotor 148 is fed by leads 149 to the aileron network of amplifier 87 and through adapter 89 and leads 149 to phase winding 151 of motor 152. Ailerons 19 are actuated by motor 152 and at the same time rotor 170 of the inductive aileron follow-back device is displaced angularly relative to its stator 171 whereby a follow-back signal is generated and fed by leads 175 to be superimposed upon the bank signal and the aileron network of the amplifier. The ailerons are actuated outwardly until the follow-back signal is equal and opposite to the bank signal at which time motor 152 becomes de-energized.

This same operation takes place as a result of the pitch signal generated within rotor 181. The signal so generated is fed into the elevator network of the amplifier by leads 182 and out therefrom by way of leads 183 to energize phase winding 184 of motor 185. Elevators 20 are actuated by motor 185 and, at the same time, rotor 205 of the inductive elevator follow-back device is displaced relative to stator 206 whereby a follow-back signal is generated and fed by leads 210 to be superimposed upon the pitch signal in the elevator network of the amplifier. The elevators are actuated outwardly until the follow-back signal is equal and opposite to the pitch signal at which time motor 185 becomes de-energized.

With the operation thus far described, craft will be swung into the desired turn with rudder, ailerons and elevators displaced as described. The direction, rate of change of course and the banked attitude of the craft all are registered by dial 56 of the master indicator, pointer 125 of gyro 13, and the mask and bar arrangement of horizon 14. The ensuing displacements of rotor 127 relative to stator 128 of the rate take-off and rotor 143 relative to stator 144 of the bank take-off, re-establish the position of electrical equilibrium with the rate and bank inductive devices at the control panel so that the rate signal within rotor 132 disappears and the bank signal of rotor 148 likewise disappears. Because both rotors 110 and 170 of the inductive follow-back devices of the rudder and aileron servo systems are at that moment displaced from their nulls and signals are effective through the rudder and aileron networks of amplifier 87 to reverse operation of motors 91 and 152 to bring the rudder and the ailerons to their neutral positions. Thus, after the craft assumes the proper turn at the correct angle of bank, the rudder and aileron surfaces will be back in their neutral positions. Should the craft turn at a slower or faster rate than that selected, rate gyro 13 will dominate to apply right or left rudder as the case may be to regulate the rate of turn to be maintained at the pre-selected value.

On approaching the new course, the turn may be terminated by operating knob 230 back to its neutral position. Such knob operation creates signals within rotors 132, 148 and 181 of the inductive receivers at the control panel, in a direction opposite to the direction of the signals generated when the original turn was initiated, which control the rudder, aileron and elevator surfaces in a direction to establish level attitude of the craft. As soon as the level attitude is attained, the condition of electrical equilibrium established between the rate, bank and pitch take-offs and their related inductive receiver devices at the control panel so that the rate, bank and pitch signals within the rotors of the latter devices, set in with the return of knob 230 to neutral, disappear and the follow-back signals of the rudder, aileron and elevator inductive follow-back devices return the related control surfaces to their neutral positions.

As soon as knob 230 is brought to its neutral position, arm 232 falls within the notch of wheel 231 engaging contact 234 with contact 233 whereby the circuit to coil 67 of the magnetic clutch of the master indicator is closed and clutch faces 64 and 65 engage so that any departure from the new course results in applied rudder to return and maintain the craft on the new course.

Airspeed adjustment knob 243 is normally set for a cruising speed and the automatic turn mechanism will operate as desired with the setting so made. Should, however, the speed of the craft be changed substantially, the proportional constant between the angle of bank and the rate of turn must be changed. This is accomplished by turning knob 243 which results in motion of rack 240 whereby the pivot point of lever 224 is moved relative to pins 222 and 237 of the bank and rate inductive receiver devices thereby changing the lever length of each of the devices.

Referring now to Figures 2 to 10, inclusive, of the drawings, there is shown one practical embodiment of the novel control panel of the present invention for actuating the automatic turn mechanism shown diagrammatically in Figure 1 and described more fully in the above referred to copending parent application. As shown in Figures 2 and 3, control panel 300 is suitably fastened by means such as screws 301 to a supporting casing 302 having a housing 303 therefor. The exterior of the panel is provided with a bank trim knob 304, a pitch control knob 305 together with an automatic turn control knob 306 superimposed thereover, as well as a vernier pitch trim knob 307. Also contained on the panel are power switch 308, servo clutch switch 309, a pitch trim indicator 310 and an airspeed adjustment knob 311 having a locking member 311a therefor.

Bank trim knob 304 is fastened to a shaft 312 (Figure 3), suitably journalled within casing 302, provided with a pinion 313 meshing with a gear sector 314 secured to the casing of an inductive repeater or receiver device 315 which is rotatably supported within a part of casing 302 and having arranged therein a three phase wound stator (similar to stator 146 of Figure 1). Actuation of knob 304 angularly displaces the casing of device 315 and its stator relative to the rotor (similar to the rotor 148 of Figure 1), so that an electrical unbalance is created between the two thereby generating an electrical signal within the rotor of device 315 independently of the bank take-off means arranged at the artificial horizon to which the device 315 is connected. Thus, the proper amount of aileron displacement is derived as heretofore explained in connection with Figure 1.

Pitch control knob 305 is fastened to a hollow sleeve 316, as better shown in Figure 3, which has secured thereto a pinion 317 for meshing with a large gear 318, shown in dotted lines in Figure 7, the latter, in turn, meshing with a pinion 319 (Figure 4) carried by a sleeve 320 clamped to a hollow shaft 321 which at its free end supports a pinion 322. The pinion drives a gear 323 carried by a second shaft 324 which also supports thereon a pinion 325 meshing with a second gear 326 pinned to a shaft 327 which is arranged within hollow shaft 321. This gear reduction drive is more clearly shown in Figure 10.

One end of inner shaft 327 carries pitch trim indicator 310 exterior of the panel and the other end of the shaft has a gear 328 fastened thereto for driving a gear sector 329 secured to the casing of an inductive repeater or receiver device 330 which is rotatably supported within a part of casing 302 and having arranged therein a three phase wound stator (similar to stator 180 of Figure 1). Actuation of pitch control knob 305 angularly displaces the casing of device 330 and its stator relative to the rotor (similar to rotor winding 181 of Figure 1) so that an electrical unbalance is created between the two thereby generating an electrical signal within the rotor of device 330 independently of the pitch take-off arranged at the artificial horizon to which device 330 is connected.

Thus, the proper amount of elevator displacement is derived to cause the craft to climb or dive as heretofore explained in connection with Figure 1. For fine adjustments desired during unbalanced loading conditions, pitch trim knob 307 is provided which may engage pitch control knob 305 through a suitable reduction gear (not shown). Trim indicator 310 indicates to the human pilot whether or not the elevators are in a neutral position.

By operating a single knob, i. e., turn knob 306, the craft may be swung into an automatic turn and maintained in such attitude until the knob is returned to its neutral position. As shown in Figure 3, knob 306 is fastened to a shaft 331 which passes through hollow sleeve 316 and carries near its free end a gear 332 which drives a gear 333 through a pinion 334, better shown in Figure 5. Gear 333 is sleeved or clamped to a shaft 335 of the rotor of inductive device 315 whereby motion of knob 306 causes angular displacement of the rotor relative to its stator so that a bank signal is generated in the rotor even though the bank take-off at the artificial horizon is in a neutral position. Displacement of the rotor of device 315 simultaneously causes an angular displacement of the rotor of an inductive rate repeater or receiver device 336 (Figure 7) whose casing supporting the stator portion is also mounted within a portion of casing 302 and also causes a displacement of the rotor of device 330.

This is accomplished by reason of a bracket 337 carried at the opposite end of rotor shaft 335, the bracket supporting the pin 338 (Figure 8) which cooperates with a slot 339 of the lever 340 pivoted on a pin 341 supported by a bracket 342 which is carried by a carriage 343. Lever 340 is provided with a second slot 344 with which cooperates a pin 345 carried by a bracket 346 fastened to a shaft 347 of the rotor of device 336. A spring 348 anchored at one end to a portion of casing 302 connects at its other end to lever 340 to absorb any backlash in the system. Thus, motion on the part of rotor shaft 335 results in angular motion of rotor shaft 347 whereby a rate signal is generated in the rotor of device 336 even though at that moment no signal is being called for by the rate gyro take-off.

As more clearly shown in Figure 5, the end of shaft 335 supporting gears 314 and 333 thereon also supports two spaced cam members 349 and 350 which may be adjusted either outwardly or inwardly with respect to each other by virtue of screws 351 (see Figure 8). In engagement with the cams is a lever 352 and has a spring 354 anchored thereto at 353, the opposite end thereof being anchored to casing 302. The opposite end of lever 352 is provided with a bracket 355 which is fastened to a shaft 356 of the rotor of device 330 whereby motion of lever 352 angularly displaces the rotor relative to its stator so that an electrical signal is generated in the rotor of device 330 even though at that moment no signal is being called for by the pitch take-off at the artificial horizon.

The extreme end of turn knob shaft 331 is provided with a wheel 360, Figure 7, having a single notch at its outer periphery in which normally rests a finger 361, pivoted at 362, and carrying a trip member 363 which abuts one of two contacts (similar to contact 233 of Figure 1) mounted within a suitable switch box 364. Thus, immediately upon actuation of turn knob 306, the contacts (not shown) within switch box 364 are opened (see Figure 1) to de-energize coil 67 of the magnetic clutch whereby the controlling connection between the magnetic field pick-up device and the motor 91 of the rudder servo system is opened, so that induction motor 91 is under the sole control of the rate signal as heretofore explained.

Power switch 308 of the panel operates contacts (not shown) arranged within a switch box 365 (Figure 6). This switch is similar to switch 74 of Figure 1 and its operation will be understood from the description given relating to Figure 1. Throwing switch 308 from its "off" position to its "on" position closes contact 73 of Figure 1 and places one of the contacts 71 of the servo clutch switch 72 across battery 69.

Switch 309 arranged on panel 300 of Figure 2 likewise operates a pair of contacts arranged within a suitable switch box 309a mounted to the rear of the panel, the contacts being designated at 71 in Figure 1. With the throwing of clutch switch 309 from its "out" to its "in" position, contacts 71 of Figure 1 are closed so that servo solenoid coils 106, 168 and 201 are energized to connect the induction motors to their respective control surfaces and at the same time coil 67 of the magnetic clutch is energized to establish a driving connection between the inductive coupling device 29 of the master indicator and the inductive transmitting device 77, assuming turn knob 306 of the panel to be in its neutral position. Operation of switch 309 to its "out" position de-energizes the solenoids as well as coil 67.

With switch 309 in its "in" position and power switch 308 in its "on" position, actuation of turn knob 306 causes de-energization of coil 67 and opens the driving connection between the rudder motor 91 and the magnetic field pick-up device but the solenoids of the rudder, aileron and elevator servo systems remain energized.

Airspeed adjustment knob 311 is fastened to a shaft 380, the latter being provided with a pinion 381 (Figure 7) for meshing with a toothed rack 382 fastened to carriage 343. Actuation of knob 311 in one direction or another moves carriage 343 together with bracket 342 in one direction or another to thereby move lever 340 in one direction or another relative to pins 338 and 345. Such relative motion varies the lever length of lever 340 so that in one position a given angular movement of the rotor of the device 315 will produce a given angular movement of the rotor of device 336 while in another position for the same angular movement of the rotor of device 315, a different movement will be imparted to the rotor of device 336 so that a varied signal is generated in the latter rotor to increase or decrease the value of the rate signal set in to compensate for widely varying airspeeds.

If desired, a pilot's disconnect switch 400 may also be provided, which may be located on the pilot's wheel so that if it is desired to de-energize the servo clutches, the pilot need merely depress a button 401 which connects a coil 402 to ground thereby energizing the coil whereupon a core 403 is urged outwardly to open servo clutch switch 72. As soon as switch 72 is opened, coil 402 is de-energized but does not close switch 72, the latter requiring a direct operation of the switch.

The novel automatic turn control panel above described is of such a character that extreme flexibility of control is provided by the automatic pilot which makes it possible to execute maneuvers by turning appropriate controls thereat. For example, sharply banked turns may be made by actuation of the turn control knob, the craft immediately returning to straight flight when the knob is returned to its central position. Steep climbs or dives may be made by operating the pitch trim knob. Moreover, a combination of turn and climbs or turns and dives may also be executed or the craft quickly thrown from a correctly banked turn in one direction to a correctly banked turn in an opposite direction.

Although but a single embodiment of this invention has been illustrated and described in detail, it is to be expressly understood that the invention is not limited thereto. Various changes may also be made in the design and arrangement of the parts without departing from the spirit and scope of the invention, as the same will now be understood by those skilled in the art. For a definition of the limits of the present invention, reference will be had primarily to the appended claims.

We claim:

1. In an automatic pilot for aircraft, a control panel for said pilot, means comprising rate, bank and pitch signal repeater devices arranged at one side of said panel and connected to remotely located rate, bank and pitch master instruments, a control knob arranged at an opposite side of said panel for actuating said repeater devices independently of said master instruments, and means operatively connecting said knob to said repeater devices.

2. In an automatic pilot for aircraft, a control panel for said pilot, means comprising rate, bank and pitch signal repeater devices arranged at one side of said panel and connected to remotely located rate, bank and pitch master instruments, a pitch control knob at an opposite side of said panel for actuating said pitch repeater device independently of its related master instrument, a turn control knob on said panel coaxial with said pitch control knob for actuating said rate, bank and pitch repeater devices independently of their related master instruments, and means operatively connecting said turn knob to said repeater devices.

3. In an automatic pilot for aircraft, a control panel for said pilot, means comprising rate, bank and pitch signal repeater devices arranged at one side of said panel and connected to remotely located rate, bank and pitch master instruments, a pitch control knob at an opposite side of said panel for actuating said pitch repeater device independently of its related master instrument, an indicator at said opposite side of said panel for indicating the operation of said pitch repeater device, a turn control knob on said panel coaxial with and superimposed over said pitch control knob for actuating said rate, bank and pitch repeater devices independently of said master instruments, and means operatively connecting said turn knob to said repeater devices.

4. In an automatic pilot for aircraft, a control panel for said pilot, electrical rate of turn signal developing means, electrical attitude change signal developing means, both of said last-named signal developing means being mounted on one side of said panel and connected to remotely located rate of turn and attitude responsive master instruments, a turn control knob on an opposite side of said panel for simultaneously actuating said rate of turn signal developing means and said attitude change signal developing means independently of said master instruments, and means operatively connecting said turn knob to said rate of turn and said attitude change signal developing means.

5. In an automatic pilot for aircraft, a control panel for said pilot, means mounted on one side of said panel and normally having a signal generated therein proportional to the rate of turn by said craft from a prescribed direction, means mounted on said one side of said panel and having signals normally generated therein proportional to the bank and pitch of said craft when said craft departs from a prescribed attitude, a turn control knob on an opposite side of said panel for actuating both of said last-named means to generate desired signals therein differing from and independently of the signals normally generated therein due to craft maneuvers preceding actuation of said knob, and means operatively connecting said knob to said rate of turn, bank and pitch signal generating means.

6. In an automatic pilot for aircraft, a control panel for said pilot, means mounted on one side of said panel and normally having a signal generated therein proportional to the rate of turn of said craft from a prescribed direction, means mounted on said one side of said panel and normally having signals generated therein proportional to the bank and pitch of said craft when said craft departs from a prescribed attitude, bank and pitch trim knobs on an opposite side of said panel for actuating said second-named means, a turn control knob on said opposite side of said panel for simultaneously actuating said first and said second-named means, and means operatively connecting said turn knob to said first and said second-named means.

7. In an automatic pilot for aircraft, a control panel for said pilot comprising a casing, means mounted within said casing having a signal normally generated therein in proportion to the rate of turn of said craft when said craft departs from a prescribed course, other means mounted within said casing having signals normally generated therein in response to the pitch and bank of said craft due to its departure from a predetermined attitude, a mechanical linkage for interconnecting said first-named means with said last-named means, a control knob exterior of said casing for operating said linkage to actuate both of said means for setting up rate, bank and pitch signals therein even though said craft is on said prescribed course and in said predetermined attitude at the moment said knob is operated, and an airspeed adjustment knob exterior of said casing connected to said linkage for variably setting the latter to compensate for varying airspeeds.

8. In an automatic pilot for aircraft, a control panel for said pilot comprising a casing, a rate signal repeater device mounted within said casing and having an angularly movable rotor therefor, a bank signal repeater device mounted within said casing and having a relatively angularly movable stator and an angularly movable rotor inductively associated therewith, a pitch signal repeater device mounted within said casing and having a relatively angularly movable stator and an angularly movable rotor inductively associated therewith, control knobs exterior of said casing for angularly displacing said bank and pitch stators, a turn control knob exterior of said casing for angularly displacing said rate, bank and pitch rotors, and means operatively connecting said turn knob to said rate, bank and pitch rotors.

9. A control panel for an automatic pilot for aircraft, comprising a casing, a rotatable inductive rate signal device within said casing, a rotatable inductive bank signal device within said casing, a rotatable inductive pitch signal device within said casing, a turn control knob exterior of said casing for simultaneously actuating said devices, and means operatively connecting said knob to said rate, bank and pitch signal devices.

10. A control panel for an automatic pilot for aircraft, comprising a casing, inductive rate, bank and pitch signal devices mounted within said casing, a bank control knob exterior of said casing for actuating said inductive bank device, a pitch control knob exterior of said casing for actuating said inductive pitch device, a turn control knob exterior of said casing for simultaneously actuating all of said devices, and means operatively connecting said turn knob to all of said devices.

11. A control panel for an automatic pilot for aircraft, comprising a casing, inductive rate, bank and pitch signal devices mounted within said casing, bank and pitch control knobs exterior of said casing for actuating said inductive bank and pitch devices respectively, a vernier adjustment for said pitch knob exterior of said casing, a turn control knob exterior of said casing for simultaneously actuating all of said devices, and means operatively connecting said turn knob to all of said devices.

12. A control panel for an automatic pilot for aircraft, comprising a casing, inductive rate, bank and pitch signal devices mounted within said casing, bank and pitch control knobs exterior of said casing for actuating said inductive bank and pitch devices respectively, a turn control knob exterior of said casing coaxial with and superimposed over said pitch control knob for simultaneously actuating all of said devices, and means operatively connecting said turn knob to all of said devices.

13. A control panel for an automatic pilot for aircraft, comprising a casing, inductive rate, bank and pitch signal devices within said casing, a link connecting said bank device to said rate device, means connecting said bank device to said pitch device, and means comprising a turn control knob exterior of said casing connected to said bank device for actuating the latter whereby said link is operated to actuate said rate device and said connecting means are operated to actuate said pitch device.

14. A control panel for an automatic pilot for aircraft, comprising a casing, inductive rate, bank and pitch signal devices mounted within said casing, a movably mounted link connecting said bank device to said rate device for actuation of the latter during operation of the former, means connecting said bank device to said pitch device, means comprising a turn control knob exterior of said casing connected to said bank device for actuating the latter whereby said link is operated to actuate asid rate device and said connecting means are operated to actuate said pitch device, and means comprising an airspeed adjustment knob exterior of said casing connected to said link for moving the latter to compensate for variations in airspeed.

15. A control panel for an automatic pilot for aircraft, comprising a casing, inductive rate, bank and pitch signal devices mounted within said casing, means comprising a link connecting said bank device to said rate device, a movable carriage for supporting said link, means connecting said bank device to said pitch device, means comprising a turn control knob exterior of said casing connected to said bank device for actuating the latter whereby said link is operated to actuate said rate device and said connecting means are operated to actuate said pitch device, and means comprising an airspeed adjustment knob exterior of said casing connected to said carriage for moving the latter to compensate for variations in airspeed.

16. In combination with a casing having an open end, a control panel for closing the open end of said casing, means comprising rate, bank and pitch signal devices mounted within said casing, a pitch control knob mounted on said panel and connected to said pitch signal device for actuation thereof, a turn control knob mounted on said panel coaxial with said pitch control knob for simultaneously actuating said rate, bank and pitch signal devices, and means operatively connecting said turn knob to said rate, bank or pitch signal devices.

17. A control panel for an automatic pilot for mobile craft provided with a rudder and having course deviation responsive means together with rate of course deviation responsive means connected to said rudder for the control thereof, a rate of turn signal device on one side of said panel and connected to said rate of course deviation responsive means and to said rudder for repeating the signal developed by said rate of course deviation responsive means during a craft deviation from a prescribed course, and means comprising a turn knob on the opposite side of said panel connected to said rate of turn device for actuating the latter to develop a rudder control signal independently of the course deviation responsive means and the rate of course deviation responsive means.

18. A control panel for an automatic pilot for mobile craft provided with aileron and elevator surfaces thereon and bank and pitch signal master instruments for controlling said surfaces, bank and pitch signal repeaters on one side of said panel connected to said bank and pitch master instruments and to said aileron and elevator surfaces respectively for repeating the signals of said master instruments, and means on the opposite side of said panel and connected to said bank and pitch signal repeaters for actuating the latter selectively or in unison for developing signals therein independently of said master instruments.

19. In an automatic pilot for aircraft, a control panel for said pilot, means comprising turn, bank and pitch signal developing devices arranged at one side of the panel and connected to remotely located turn, bank and pitch responsive master instruments, a movable control element arranged at an opposite side of the panel for actuating said signal developing devices independently of the master instruments, and means operatively connecting said control element to said signal developing means.

20. A control panel for an automatic pilot for aircraft, comprising a casing, a rotatable inductive turn signal developing device within said casing, a rotatable inductive bank signal developing device within said casing, a rotatable inductive pitch signal developing device within said casing, a movable turn control knob exterior of said casing for simultaneously actuating said devices, and means operatively connecting said knob to said turn, bank and pitch signal developing devices.

21. A control panel for an automatic pilot for aircraft, comprising a casing, a turn signal developing device having a movable part mounted within said casing, a bank signal developing device having a movable part mounted within said casing, a pitch signal developing device having a movable part mounted within said casing, a movable turn control element exterior of said casing for simultaneously actuating said devices, and means operatively connecting said element to said turn, bank and pitch signal developing devices.

PAUL A. NOXON.
NORMAN B. MURPHY.

REFERENCES CITED

The following references are of record in the file of this patent:

UNITED STATES PATENTS

| Number | Name | Date |
|---|---|---|
| 1,801,948 | Boykow | Apr. 21, 1931 |
| 2,144,616 | Carlson | Jan. 24, 1939 |
| 2,203,671 | Carlson | June 11, 1940 |
| 2,270,875 | Hanson et al. | Jan. 27, 1942 |
| 2,325,108 | Carlson | July 27, 1943 |
| 2,380,425 | Frische et al. | July 31, 1945 |
| 2,415,430 | Frische et al. | Feb. 11, 1947 |